(12) United States Patent
Uysal et al.

(10) Patent No.: US 7,979,742 B2
(45) Date of Patent: Jul. 12, 2011

(54) RECOVERABILITY OF A DATASET ASSOCIATED WITH A MULTI-TIER STORAGE SYSTEM

(75) Inventors: Mustafa Uysal, Palo Alto, CA (US); Arif A. Merchant, Palo Alto, CA (US); Kimberly Keeton, Palo Alto, CA (US); Marcos K. Aguilera, Palo Alto, CA (US); Kiran-Kumar Muniswamy-Reddy, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 641 days.

(21) Appl. No.: 11/880,391

(22) Filed: Jul. 19, 2007

(65) Prior Publication Data
US 2009/0024813 A1    Jan. 22, 2009

(51) Int. Cl.
*G06F 11/00*    (2006.01)
(52) U.S. Cl. .................. 714/20; 714/2; 714/42

(58) Field of Classification Search .......... 714/20, 714/2, 6.2, 42
See application file for complete search history.

(56) References Cited

U.S. PATENT DOCUMENTS

| | | | |
|---|---|---|---|
| 7,552,358 B1* | 6/2009 | Asgar-Deen et al. | 714/6 |
| 2005/0172166 A1* | 8/2005 | Eguchi et al. | 714/20 |
| 2006/0041719 A1* | 2/2006 | Chui et al. | 711/117 |
| 2007/0033437 A1* | 2/2007 | Kawamura et al. | 714/20 |
| 2007/0185923 A1* | 8/2007 | Nishikawa et al. | 707/202 |
| 2008/0133969 A1* | 6/2008 | Manoj | 714/20 |

* cited by examiner

*Primary Examiner* — Scott T Baderman
*Assistant Examiner* — Sarai Butler (57) ABSTRACT

A method and a system of improving recoverability of a dataset associated with a multi-tier storage system are provided. Updates to a dataset are stored in first storage. The dataset and a point-in-time copy of the dataset reside on second storage, and the first storage provides higher reliability than the second storage. The dataset is restored using at least a subset of the stored updates in combination with the point-in-time copy in the event that the dataset is lost.

20 Claims, 5 Drawing Sheets

RECOVERABILITY OF A DATASET ASSOCIATED WITH A MULTI-TIER STORAGE SYSTEM

TECHNICAL FIELD

Embodiments of the present invention relate to recovering data. More specifically, embodiments of the present invention relate to improving recoverability of a dataset associated with a multi-tier storage system.

BACKGROUND ART

With the advent of computers, electronic storage can be used to store data sets. Various types of problems can occur that result in losing a dataset. These problems include but are not limited to operator mistakes, disk crashes, site failures and disasters. Mechanisms have been developed for recovering lost datasets. These mechanisms include but are not limited to mirroring a dataset, taking a snapshot of a dataset, and taking backups of datasets. Typically, the more reliable a piece of hardware is the more recoverability capabilities that particular piece of hardware provides and the more expensive it will be. Therefore, multi-tier storage systems have been developed to provide different levels of reliability for different datasets. Some datasets include extremely important data while other datasets include less important data. Datasets with more important data can be stored on a more costly tier that provides a high level of reliability and hence high recoverability and datasets with less important data can be stored on a less costly tier that provides a lower level of reliability and hence lower recoverability. In general, recoverability refers to the ability to recover from data loss or corruption.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of various embodiments of the present invention, numerous specific details are set forth in order to provide a thorough understanding of the present invention. In other instances, well-known methods, procedures, components, and circuits have not been described in detail as not to unnecessarily obscure aspects of the present invention.

Overview

As already stated, multi-tier storage systems have been developed to provide different levels of reliability for different datasets depending on the importance of the data associated with the datasets. With conventional multi-tier storage systems, the datasets stored on lower tiers are provided with less reliability. The different levels of a multi-tier storage system may also differ in their level of availability, performance or security. According to one embodiment, datasets can be stored on lower tiers that are less costly than higher tiers but at the same time be provided with a higher level of reliability. As will become more evident, the probability of recovering a dataset, which resides on a lower tier that provides less reliability, is increased by storing updates to that dataset on a tier that provides a high level of reliability, according to one embodiment.

Timeline for a Dataset

Figure 1:
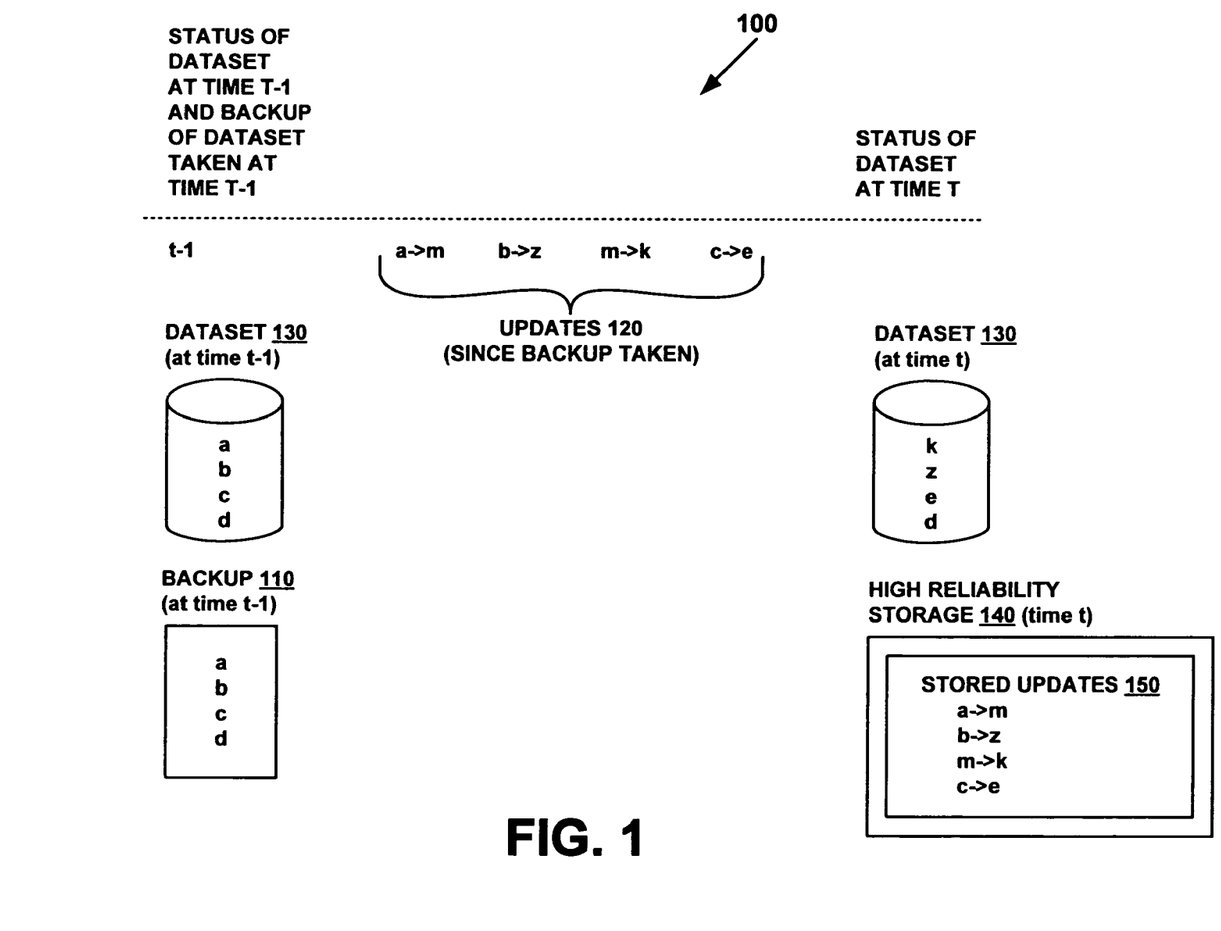
FIG. 1 depicts a timeline of a dataset, according to one embodiment.

FIG. 1 depicts a timeline 100 of a dataset, according to one embodiment. At time t–1 a backup 110 of a dataset is created. The data set will be backed up again at time t. Various updates 120 are performed on the dataset after the backup 110 was taken at time t–1. The updates 120 occurred from time t–1 until time t. At time t, the dataset 130 includes all of the updates 120 that occurred since the backup 110 was taken at time t–1.

Assume that the dataset 130 resides on a storage tier that provides lower reliability (also referred to herein as a "lower tier") than the storage tier that provides the highest reliability (also referred to herein as the "highest tier") of a multi-tier storage system. If the dataset 130 is lost between time t–1, when the last backup 110 was taken, and time t, when the next backup is scheduled, a conventional multi-tier storage system would lose the updates 120 that occurred between time t–1 and time t. However, according to one embodiment, the dataset 130 can be fully recovered, for example, by storing the updates 120 in storage 140 that provides high reliability resulting in stored updates 150. For example, if the dataset 130 is lost between time t–1 and t, the backup 110 in combination with the stored updates 150 can be used to recover the dataset 130 as it existed at the time of the failure, according to one embodiment. The dataset 130 can be recovered by recovering data from the backup 110 and applying the stored updates 150 to the recovered data.

Since, according to one embodiment, the updates 150 are stored on storage 140 that provides the highest reliability, the highest reliability is provided for the dataset 130 even though the dataset 130 is stored on storage that provides a lower level of reliability. Therefore, high reliability can be provided for the dataset 130 while at the same time using the less expensive storage for the dataset 130, as will become more evident. Without storing the updates 150 in the high reliability storage 140, the updates 120 would not be available to recover the data set 130, for example, at any time between time t–1 and time t. The phrase "replaying updates" is also commonly used to refer to recovering a dataset 130 using a backup 110 and stored updates 150.

According to one embodiment, a recoverability log is a log of updates 120 stored in high reliability storage 140; this log stores updates 120 that are destined for a lower tier until the lower tier is protected by a point-in-time copy. According to one embodiment, the updates 120 may be stored in log form in the recoverability log. According to another embodiment, the updates 120 are stored as most recent update values for given locations of the dataset 130.

Reliability of Storage

Figure 2:
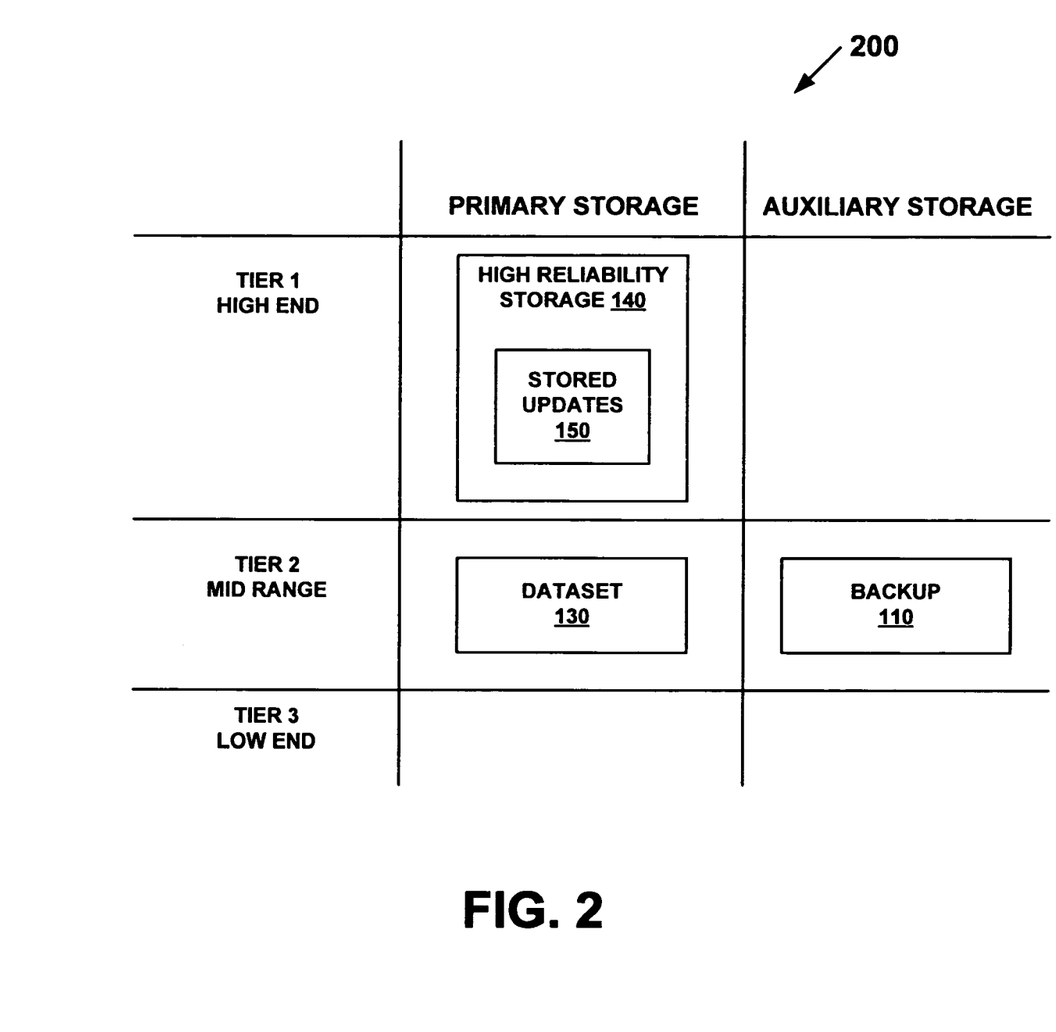
FIG. 2 depicts a multi-tier storage system, according to one embodiment.

According to one embodiment, updates 120 to a dataset are stored on a tier that provides the highest reliability provided by a multi-tier storage system. FIG. 2 depicts a multi-tier storage system 200, according to one embodiment. The first column provides labels of the tiers and descriptions of their levels of reliability. The second column represents the contents of primary storage associated with a tier. The third column represents contents of auxiliary storage, such as tape, associated with a tier. For example, tier 1 can utilize expensive high end disk arrays protected by remote mirroring, snapshot, and daily backup. Tier 2 can utilize less expensive disk arrays protected by snapshot and daily backup. Tier 3 can utilize even less expensive disk arrays protected by weekly backup.

FIG. 2 depicts a dataset 130, a backup 110 of the dataset 130, and highly reliable storage 140 that includes stored updates 150 for updates 120 made to the dataset 130. As depicted in FIG. 2, the dataset 130 and its backup 110 are associated with tier 2. The dataset 130 resides on tier 2's primary storage and the backup 110 resides on tier 2's auxiliary storage. Tier 2 does not provide the highest level of reliability. The backup 110 of the dataset was performed at time t−1. The stored updates 150, which are stored on tier 1, include the updates 120 that were performed on the dataset 130 from time t−1 to the current time t. In this example, the dataset 130 also includes all of the updates 120 that were performed from time t−1 to the current time t. Although FIG. 2 depicts the dataset 130 and the backup 110 on tier 2, the dataset 130 and the backup 110 can reside on any tier that is lower than the highest tier.

If the dataset 130 is lost, the dataset 130 can be restored using the stored updates 150 and the backup 110, according to one embodiment. Since, according to one embodiment, the stored updates 150 reside on storage 140 that provides the highest reliability, the highest reliability is provided for the dataset 130 even though the dataset 130 is stored on storage that provides a lower level of reliability. Therefore, high reliability can be provided for the dataset 130 while at the same time using the less expensive storage (tier 2) for the dataset 130.

Point-in-Time Copies, Full Backups, Incremental Backups, Snapshots

According to one embodiment, backups are made at relatively infrequent points in time by copying an entire dataset (also known as "full backups") or by copying updates since the last time a dataset was backed up (also known as "incremental backups"). Backups can be stored on tape or disks that are relatively inexpensive. To protect against site disasters, backups may be transported to offsite vaults.

According to one embodiment, snapshots capture the state of stored data at a given point in time, typically in a very space efficient manner by using for example copy-on-write or similar techniques. Snapshots are useful to undo user mistakes and software errors, among other things. However, snapshots are less useful to recover from disk failures or disasters because snapshots share data with copies of datasets that reside on primary storage. Therefore, if a copy of a dataset on primary storage is lost, the snapshot will also be affected. Snapshots are also useful to produce consistent online backups. For example, a snapshot can be taken and a backup can be created based on the snapshot.

According to one embodiment, the term "point-in-time copy" describes a copy of a dataset at a given instant in time, which reflects all updates to the dataset up to that instant in time; examples of point-in-time copies include full backups, incremental backups, and snapshots, among other things. Although many of the embodiments are described using a backup, various embodiments can be applied to other types of point-in-time copies such as a snapshot or an asynchronous remote mirror associated with a lower tier, depending for example on the type of failure that occurred and the capabilities provided by the lower tier.

On Site and Off Site

Storage that resides at the same location as a multi-tier storage system is considered to be "local" or "on site." Storage that resides at a different location than where a multi-tier storage system resides is considered to be "remote" or "off site." Remote storage may be used to store copies of datasets, also called remote mirrors, or snapshots of a remote mirror, and so on. According to one embodiment, the stored updates are mirrored on remote storage. In the event of an entire site failing, a dataset can be restored using the mirrored updates and an off-site backup copy of the lower tier.

Updates

According to one embodiment, the updates 120 are stored in a recoverability log. According to another embodiment, updates are maintained on a per-tier basis. For example, referring to FIG. 2, there may be separate recoverability logs for tier 2 and tier 3. According to one embodiment, the recoverability logs are stored on tier 1.

According to one embodiment, stored updates 150 reside at the highest tier until the dataset 130 that includes the updates 120 is backed up. For example, if a first backup of a dataset 130 is performed at time t−1 and the dataset 130 is updated from time t−1 until time t, the updates 150 will be stored in tier 1 until the dataset 130 is backed up again for example at time t. The portion of stored updates 150 that were made from time t−1 until time t can be removed from the highest tier after the dataset 130 is backed up at time t.

According to yet another embodiment, a portion of the stored updates 150 is not removed from the highest tier until that portion has been stored remotely to protect for example against site disasters. For example, if a recoverability log stored on tier 1 includes stored updates that were made from time t−5 until time t, the portion of the recoverability log from time t−5 until t−4 will not be removed from the recoverability log until that portion from t−5 until t−4 has been stored remotely. According to one embodiment, "a portion of stored updates" may be a subset of updates stored on highly reliable storage or all of the updates stored on the highly reliable storage.

Continuous Data Protection

According to one embodiment, data protection is provided continuously (also referred to herein as continuous data protection). For example, according to one embodiment, continuous data protection enables the contents of a dataset to be recovered for virtually any point in time, as will become more evident.

According to one embodiment, stored updates 150 reside on storage 140 that provides the highest level of reliability associated with a multi-tier storage system 200. The storage 140 that provides the highest reliability is the most expensive storage. In order to contain costs, a limited amount of updates is stored on the most reliable storage, according to one embodiment. However despite this, continuous data protection is still provided for a dataset 130, according to one embodiment. For example, the stored updates 150 can be periodically backed up, to the auxiliary storage associated with the highest tier. The stored updates 150 may be backed up to storage that is remote or local. Since, according to one embodiment, the stored updates 150 are backed up, a very large amount of updates 120 can be saved. For example, the amount of updates 120 that can be saved is proportional to the amount of backup storage associated with a system. Typically, this is orders of magnitude larger than the primary storage associated with the system. According to one embodiment, continuous data protection is provided for an entire file system by storing updates made to all of the tiers including the highest tier.

Figure 3:
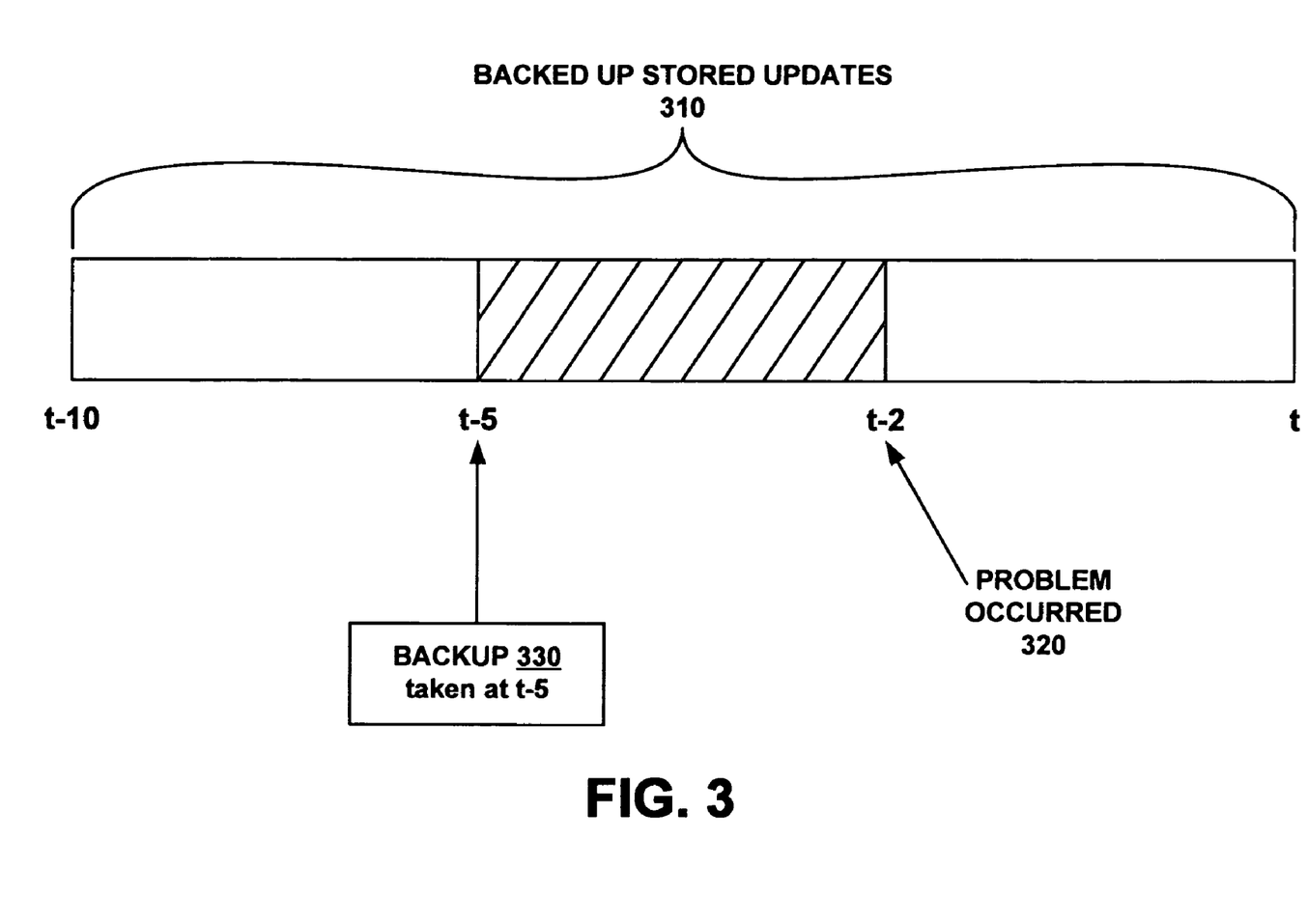
FIG. 3 depicts updates of a dataset that have been backed up, according to one embodiment.

FIG. 3 depicts updates of a dataset that have been backed up, according to one embodiment. Assume, for the purposes of illustration that the stored updates 150 from a high reliability tier, as depicted in FIG. 2, were backed up resulting in the backed up stored updates 310 depicted in FIG. 3. The backed up stored updates 310 include updates that have been made to a dataset 130 from time t−10 until a current time t. Assume, for example, that a problem occurs at time t−2 such as an operator mistake, which causes data generated after time t−2 to be garbled, erroneous, or unreliable. Then, one would like to restore data to what it was at time t−2, before the problem occurred. To do so, a portion of the backed up stored updates 310 can be used to recover a dataset 130 up until the time that the problem occurred 320. For example, updates that were made from time t−5 until the problem occurred 320 at time t−2 can be used in combination with the backup 330 that was taken at time t−5. Continuous data protection can be provided using other types of point-in-time copies other than a backup 330.

Selectively Choosing Between the Most Recent Version of a Point-in-Time Copy and Stored Updates to Recover Data According to one embodiment, a dataset is recovered by choosing the most recent version between a point-in-time copy and stored updates to recover data. For example, assume that a backup of a dataset includes the most recent version of block B. However, the updates stored on highly reliable storage include the most recent versions for blocks A and C. In this example, the dataset would be recovered using blocks A and C from the stored updates and block B from the backup. According to one embodiment, blocks from the stored updates and the backup can be restored in parallel.

Consistent Full System Point-in-Time Copies

Periodically full system point-in-time copies may be performed in order to archive data associated with an entire file system stored on a multi-tier storage system. The state of the data associated with the point-in-time copy of an entire file system should be consistent. For example, assume that a file system on a multi-tier storage system includes dataset A on one tier and dataset B on another tier. It would be desirable to backup datasets A and B at the same point in time to provide a consistent backup for that point in time. However, even if the backups are requested simultaneously, typically the backups end up being performed at different points in time. Various mechanisms can be used to backup data for various datasets A and B as it existed at a particular point in time while being able to actually perform the backups for the different datasets at different points in time.

For example, conventional multi-tier storage systems require that an application that is performing updates to a file system be stopped in order to consistently backup a file system. However, various embodiments of the present invention enable backing up an entire file system without stopping an application. According to one embodiment, before point-in-time copies of the datasets associated with a multi-tier storage system are performed, block-level writes to each of the tiers are paused at a point when a consistent file system image exists (e.g., there are no unattached inodes). Writes without blocking can continue to be accepted, for example, because they can be logged in a recoverability log that includes datasets' updates, even though the block level writes to each tier are paused. Once the writes are paused, a point-in-time copy, for example a snapshot, of each tier can be taken. The point-in-time copies of each tier will include consistent data for a particular instant in time even if the point-in-time copies are taken at slightly different times. According to one embodiment, techniques such as copy-on-write are used to implement snapshot capabilities for the tiers that do not provide snapshots natively. Once the snapshot for a tier has been taken, the updates for that tier, which are saved for example in the recoverability log, can be applied to the tier. When this is complete, normal writes to this tier can resume. When snapshots at all the tiers have completed, the collection together comprises a consistent snapshot of the entire file system. A consistent backup of the entire file system can be made by backing up this collection of snapshots.

System for Improving Recoverability of a Multi-Tier Storage System

Figure 4:
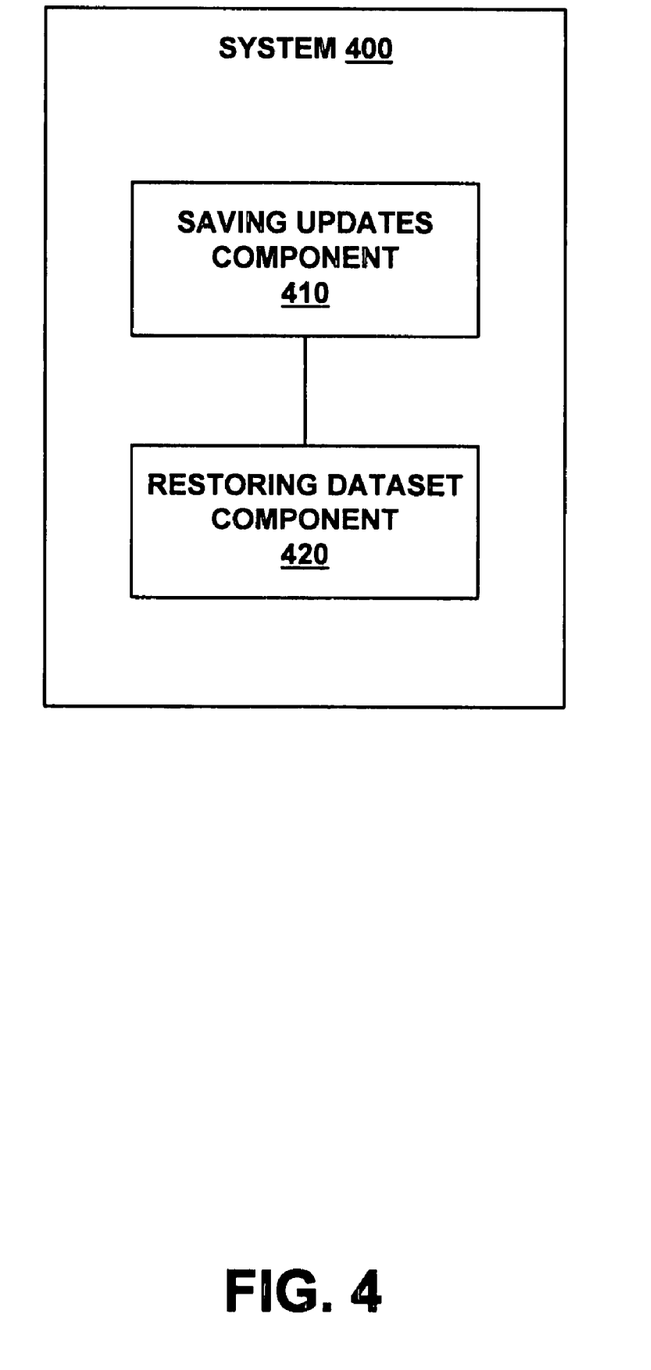
FIG. 4 is a block diagram of a system for improving recoverability of a multi-tier storage system, according to one embodiment.

FIG. 4 is a block diagram of a system for improving recoverability of a multi-tier storage system, according to one embodiment. The blocks depicted in FIG. 4 represent features of the system 400. The blocks that represent features in FIG. 4 can be arranged differently than as illustrated, and can implement additional or fewer features than what are described herein. Further, the features represented by the blocks in FIG. 4 can be combined in various ways. The system 400 can be implemented using software, hardware, firmware, or a combination thereof.

The system 400 includes saving-to-higher-reliability-storage-the-updates-made-to-lower-reliability-storage-component 410 (referred to hereinafter as a "saving updates component") and a restoring-dataset-using-updates-from-higher-reliability-storage-than-storage-for-dataset-component 420 (referred to hereinafter as a "restoring dataset component"). The saving updates component 410 is coupled with the restoring dataset component 420. The saving updates component 410 is configured for storing to first storage updates to the dataset where the dataset and a point-in-time copy of the dataset reside on second storage, and the first storage provides higher reliability than the second storage. The restoring dataset component 420 is configured for using at least a subset of the stored updates and the backup to recover the dataset in the event that the dataset was lost.

Method for Improving Recoverability of a Multi-Tier Storage System

Figure 5:
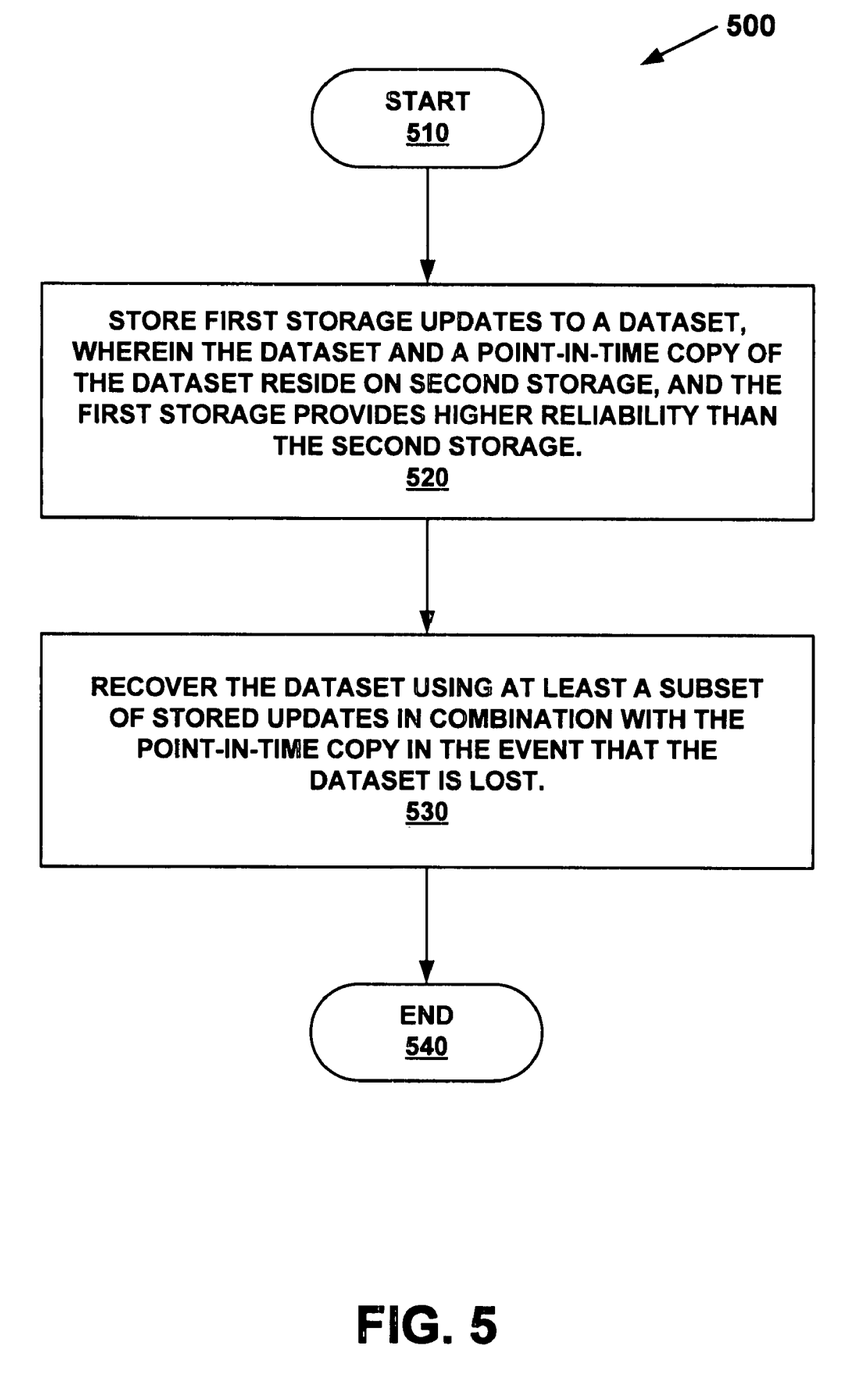
FIG. 5 is a flowchart for a method of improving recoverability of a multi-tier storage system, according to one embodiment.

FIG. 5 is a flowchart for a method of improving recoverability of a multi-tier storage system, according to one embodiment. Although specific steps are disclosed in flowchart 500, such steps are exemplary. That is, embodiments of the present invention are well suited to performing various other steps or variations of the steps recited in flowchart 500. It is appreciated that the steps in flowchart 500 may be performed in an order different than presented, and that not all of the steps in flowchart 500 may be performed.

All of, or a portion of, the embodiments described by flowchart 500 can be implemented using computer-readable and computer-executable instructions which reside, for example, in computer-usable media of a computer system or like device. As described above, certain processes and steps of the present invention are realized, in an embodiment, as a series of instructions (e.g., software program) that reside within computer readable memory of a computer system and are executed by the processor of the computer system. When executed, the instructions cause the computer system to implement the functionality of the present invention as described below.

At step 510, the method begins.

At step 520, store to first storage updates to the dataset. For example, referring to FIG. 2, updates 120 to a dataset 130 are stored in first storage 140 associated with tier 1 resulting in stored updates 150. The first storage, tier 1, provides higher reliability than the second storage, tier 2. The dataset 130 and a backup 110 of the dataset reside on the second storage, tier 2. Referring to FIG. 1, the backup 110 of the dataset was created at time t−1. Updates 120 are performed on the dataset from time t−1 until the current time t. The saving updates component 410 (FIG. 4) saves updates 120 (FIG. 1) that were performed on a dataset 130 from time t−1 until time t resulting in stored updates 150. The stored updates 150 are associated with storage that has a higher reliability than the storage that the dataset 130 resides on. For example, referring to FIG. 2, the stored updates 150 are associated with tier 1's storage 140 and the dataset 130 resides on tier 2. According to one embodiment, the updates 120 are stored in a recoverability log.

At step 530, the dataset is recovered using at least a subset of the stored updates in combination with the point-in-time copy in the event that the dataset is lost. For example, referring to FIG. 2 assume that the dataset 130 is lost due to a problem. According to one embodiment, the dataset 130 is restored using at least a subset of the stored updates 150 that are stored on highly reliable storage 140 associated with tier 1 in combination with the backup 110 that is stored on tier 2's auxiliary storage. According to one embodiment, the stored updates 150 and the backup 110 may be used as a part of performing a consistent full system point-in-time copy of an entire file system that resides on a multi-tier storage system 200. According to another embodiment, the stored updates 150 may be mirrored and the mirrored updates can be used in combination with an offsite backup to recover a dataset 130 after the entire site fails. According to yet another embodiment, the stored updates 150 may be backed up. For example, referring to FIG. 3, continuous data protection can be provided using the backed up stored updates 310 in combination with a dataset's backup 330. According to still another embodiment, a dataset 130 is recovered by choosing the most recent version between a point-in-time copy and stored updates 150 in parallel. For example, the most recent blocks for a dataset 130 are retrieved from either the stored updates 150 or the backup 110 depending on which includes the most recent blocks. The most recent blocks may be retrieved from the stored updates 150 and the backup 110 in parallel. By using highly reliable storage to store updates, the probability of recovering a dataset that resides on less reliable storage is increased, according to one embodiment.

At step 540, the method ends.

Various embodiments have been described in various combinations. However, any two or more embodiments may be combined. Further, any embodiment may be used separately from other embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of improving recoverability of a dataset associated with a multi-tier storage system, the method comprising:
    storing to first storage updates to the dataset, wherein the dataset and a point-in-time copy of the dataset reside on second storage, wherein said dataset does not reside on said first storage, and the first storage provides higher reliability than the second storage; and
    recovering the dataset using at least a subset of the stored updates in combination with the point-in-time copy in the event that the dataset is lost.

2. The method as recited by claim 1, wherein the storing to first storage the updates to the dataset further comprises:
    storing the updates in a recoverability log.

3. The method as recited by claim 1, wherein the storing to first storage the updates to the dataset further comprises
    storing the updates in a tier of the multi-tier storage system that provides the highest reliability.

4. The method as recited by claim 1, wherein the method further comprises:
    copying at least a portion of the stored updates to enable continuous data protection for the dataset; and
    recovering the dataset using the copied portion and the dataset's point-in-time copy.

5. The method as recited by claim 4, wherein the method further comprises:
    removing a portion of the stored updates from the first storage after the dataset, which includes the portion of the updates corresponding to the stored updates to be removed, has been copied.

6. The method as recited by claim 1, wherein the method further comprises:
    using the stored updates to enable a consistent point-in-time copy of an entire file system stored on the multi-tier storage system.

7. The method as recited by claim 6, wherein the method further comprises:
    pausing block-level writes to each tier associated with the multi-tier storage system; and
    once the block-level writes have been paused, creating point-in-time copies of the tiers.

8. A system of improving recoverability of a dataset associated with a multi-tier storage system, the system comprising:
    a saving-to-higher-reliability-storage-the-updates-made-to-lower-reliability-storage-component configured for storing to first storage updates to the dataset, wherein the dataset and a point-in-time copy of the dataset reside on second storage, wherein said dataset does not reside on said first storage, and the first storage provides higher reliability than the second storage; and a restoring-dataset-using-updates-from-higher-reliability-storage-than storage-for-dataset-component configured for recovering the dataset using at least a subset of the stored updates in combination with the point-in-time copy in the event that the dataset is lost.

9. The system of claim 8, wherein the updates are stored in a recoverability log.

10. The system of claim 8, wherein the updates are stored in a tier that provides the highest reliability for a multi-tier storage system.

11. The system of claim 8, wherein at least a portion of the stored updates are backed up and wherein the backed up portion and the dataset's point-in-time copy are used to recover the dataset.

12. The system of claim 8, wherein the system creates a remote mirror of the stored updates and the restoring-dataset-using-updates-from-higher-reliability-storage-than storage-for-dataset-component uses the remotely mirrored updates and the point-in-time copy to recover the dataset.

13. A computer-usable medium having computer-readable program code embodied therein for causing a computer system to perform a method of improving recoverability of a dataset associated with a multi-tier storage system, the method comprising:

storing to first storage updates to the dataset, wherein the dataset and a point-in-time copy of the dataset reside on second storage, wherein said dataset does not reside on said first storage, and the first storage provides higher reliability than the second storage; and recovering the dataset using at least a subset of the stored updates in combination with the point-in-time copy in the event that the dataset is lost.

14. The computer-usable medium of claim 13, wherein the computer-readable program code embodied therein causes a computer system to perform the method, and wherein the method further comprises:

creating a remote mirror of at least a portion of the stored updates; and using the remotely mirrored portion in combination with the point-in-time copy to recover the dataset.

15. The computer-usable medium of claim 13, wherein the computer-readable program code embodied therein causes a computer system to perform the method, and wherein the storing to first storage the updates to the dataset further comprises:

storing the updates in a recoverability log.

16. The computer-usable medium of claim 13, wherein the computer-readable program code embodied therein causes a computer system to perform the method, and wherein the method further comprises:

remotely storing at least a portion of the stored updates; and using at least a portion of the remotely stored updates and the point-in-time copy of the dataset to recover the dataset.

17. The computer-usable medium of claim 16, wherein the computer-readable program code embodied therein causes a computer system to perform the method, and wherein the method further comprises:

removing the portion that was remotely stored from the stored updates associated with the first storage.

18. The computer-usable medium of claim 13, wherein the computer-readable program code embodied therein causes a computer system to perform the method, and wherein the method further comprises maintaining first updates and second updates on the highest tier of the multi-tier storage system, wherein the first updates are for a first dataset and the second updates are for a second dataset and wherein the first dataset resides on a different tier than the second dataset.

19. The computer-usable medium of claim 13, wherein the computer-readable program code embodied therein causes a computer system to perform the method, and wherein the method further comprises restoring the dataset by selectively choosing between the point-in-time copy and the stored updates.

20. The computer-usable medium of claim 19, wherein the computer-readable program code embodied therein causes a computer system to perform the method, and wherein the restoring the dataset by selectively choosing further comprises using a first block from the stored updates and a second block from the point-in-time copy to recover the dataset, wherein the first block and the second block are the most recent versions of their corresponding blocks in the dataset.

* * * * *